United States Patent [19]

Furukawa et al.

[11] Patent Number: 5,251,024
[45] Date of Patent: Oct. 5, 1993

[54] IMAGE READER USING CCD LINE SENSORS

[75] Inventors: Itaru Furukawa; Takashi Sakamoto, both of Kyoto, Japan

[73] Assignee: Dainippon Screen Mfg. Co., Ltd., Kyoto, Japan

[21] Appl. No.: 662,607

[22] Filed: Mar. 1, 1991

[30] Foreign Application Priority Data

Mar. 27, 1990 [JP] Japan .................................. 2-77666

[51] Int. Cl.$^5$ .............................................. G03F 3/08
[52] U.S. Cl. .................................... 358/527; 358/500; 358/523
[58] Field of Search ......................... 358/75, 80, 78

[56] References Cited

U.S. PATENT DOCUMENTS

| | | | |
|---|---|---|---|
| 4,941,037 | 7/1990 | Sasaki et al. | 358/80 |
| 4,942,462 | 7/1990 | Shiota | 358/80 |
| 4,992,863 | 2/1991 | Moriya | 358/80 |
| 5,049,985 | 9/1991 | Outa | 358/80 |
| 5,126,838 | 6/1992 | Ohsawa et al. | 358/75 |

FOREIGN PATENT DOCUMENTS

| | | |
|---|---|---|
| 267793 | 5/1988 | European Pat. Off. |
| 55-142345 | 11/1980 | Japan |
| 2-16875 | 1/1990 | Japan |
| 2-174381 | 7/1990 | Japan |

*Primary Examiner*—Edward L. Coles, Sr.
*Assistant Examiner*—Thomas L. Stoll
*Attorney, Agent, or Firm*—Lowe, Price, LeBlanc & Becker

[57] ABSTRACT

An image reader using CCD line sensors which effects color correction of three color difference signals resulting from reading of a color original by the CCD line sensors. This image reader employs a plurality of color correction characteristics for enlarging the color difference signals in regions where the color difference signals are large, and limiting enlargement ratios of the color difference signals in regions where the color difference signals are small. A color correction characteristic is selected manually or in accordance with the luminance level of each pixel. Noises appearing in shadow portions are reduced by the color correction based on the limited enlargement ratios of the color difference signals effected in the regions where the color difference signals are small.

15 Claims, 7 Drawing Sheets

IMAGE READER USING CCD LINE SENSORS

BACKGROUND OF THE INVENTION

1. Field of the Invention

The present invention relates to an image reader using CCD line sensors, such as a prepress flat-bed color scanner, and more particularly to the technique of reducing noise components included in image signals output from the CCD line sensors.

2. Description of the Prior Art

Output voltage of a CCD line sensor is not 0 V even when there is no incident light (i.e. in a light-shielded state). In order to read an image or the like through a CCD line sensor without impairing its tones, therefore, it is necessary to set an output voltage in the light-shielded state for use as a reference (hereinafter referred to as black reference level) and to subtract this black reference level from an output voltage occurring during a light reception to obtain an output voltage proportional to a quantity of incident light.

To obtain the black reference level noted above, a CCD line sensor normally includes, at ends of its pixel array, a plurality of pixels which are constantly in a light-shielded condition (hereinafter referred to as black reference pixels). Conventionally, compensation for the output of the CCD line sensor is carried out using the black reference pixels as set out below.

The output signal of one particular black reference pixel or an average of output signals of a plurality of black reference pixels in the CCD line sensor is sampled and held as the black reference level for one line. The black reference level is subtracted from output signals (image signals) of effective pixels, thereby to compensate for the output of the CCD line sensor.

However, the known construction noted above has the following disadvantage:

According to the known construction, the output compensation is effected by subtracting the same black reference level from all image signals covering one line read by the CCD line sensor. If noise is included in the black reference level, all the image signals for one line are prone to its influence. The image recorded by means of these signals will reflect the noise in the form of a streak often striking to sight.

With the method of using an average of output signals of a plurality of black reference pixels, the noises included in the individual black reference pixels are leveled out. This, of course, results in a reduction in the influence of noise compared with the method of using the output signal of one black reference pixel as the black reference level. However, an image scanner such as a prepress color scanner carries out logarithmic transformation of image signals to obtain density signals. Since the scale of shadow portions is enlarged through this operation, the noise still is visible in the form of a streak in the shadow portions.

Through the researches conducted to overcome such a disadvantage, the inventors have found that, apart from the noise being enlarged in the shadow portions as a result of the logarithmic transformation, noises in color difference signals also are enlarged when color correction is effected for the color difference signals in a color changing unit. This fact will be described hereinafter with reference to FIGS. 1 and 2.

Figure 1:
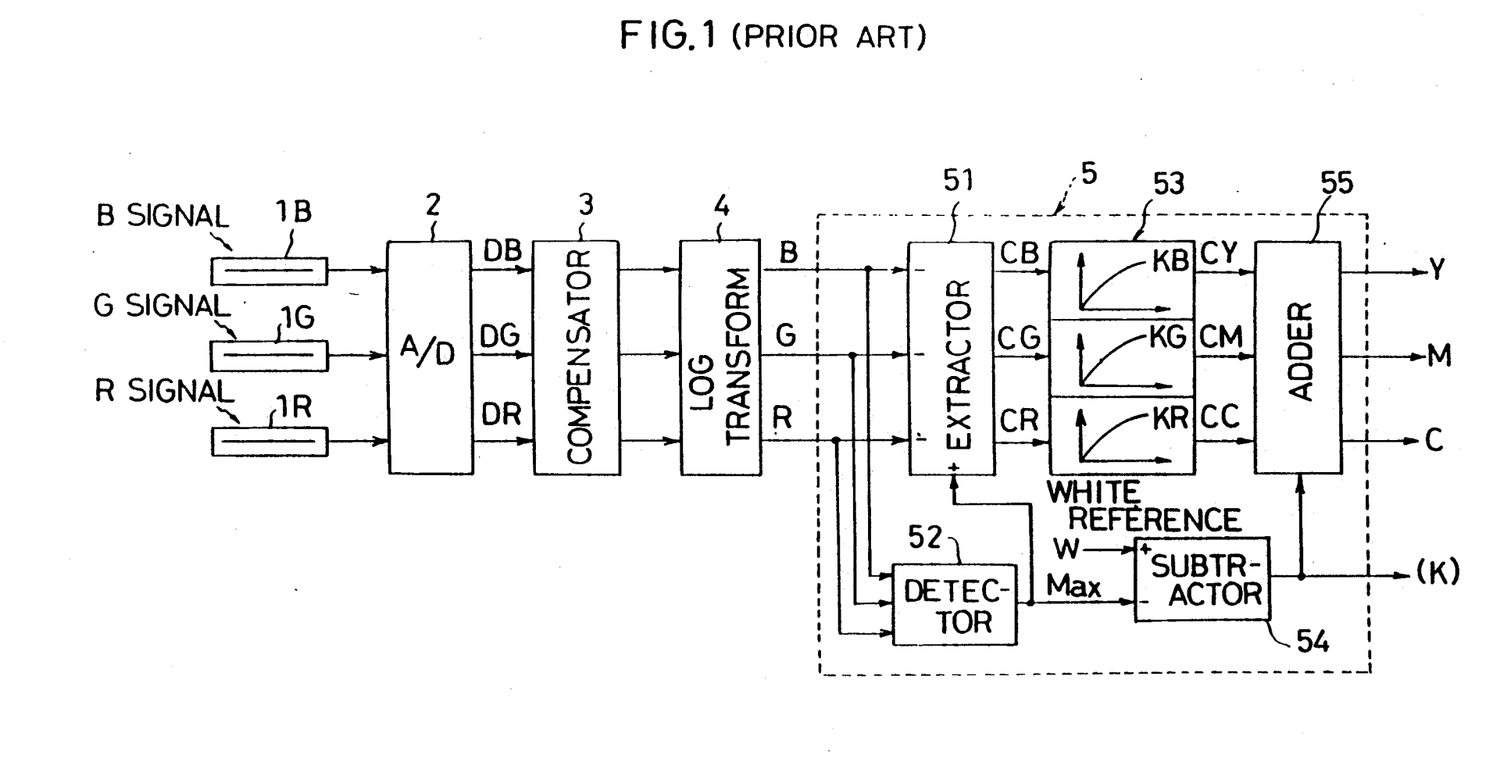
FIG. 1 is a block diagram showing an outline of a conventional image reader.
Figure 2:
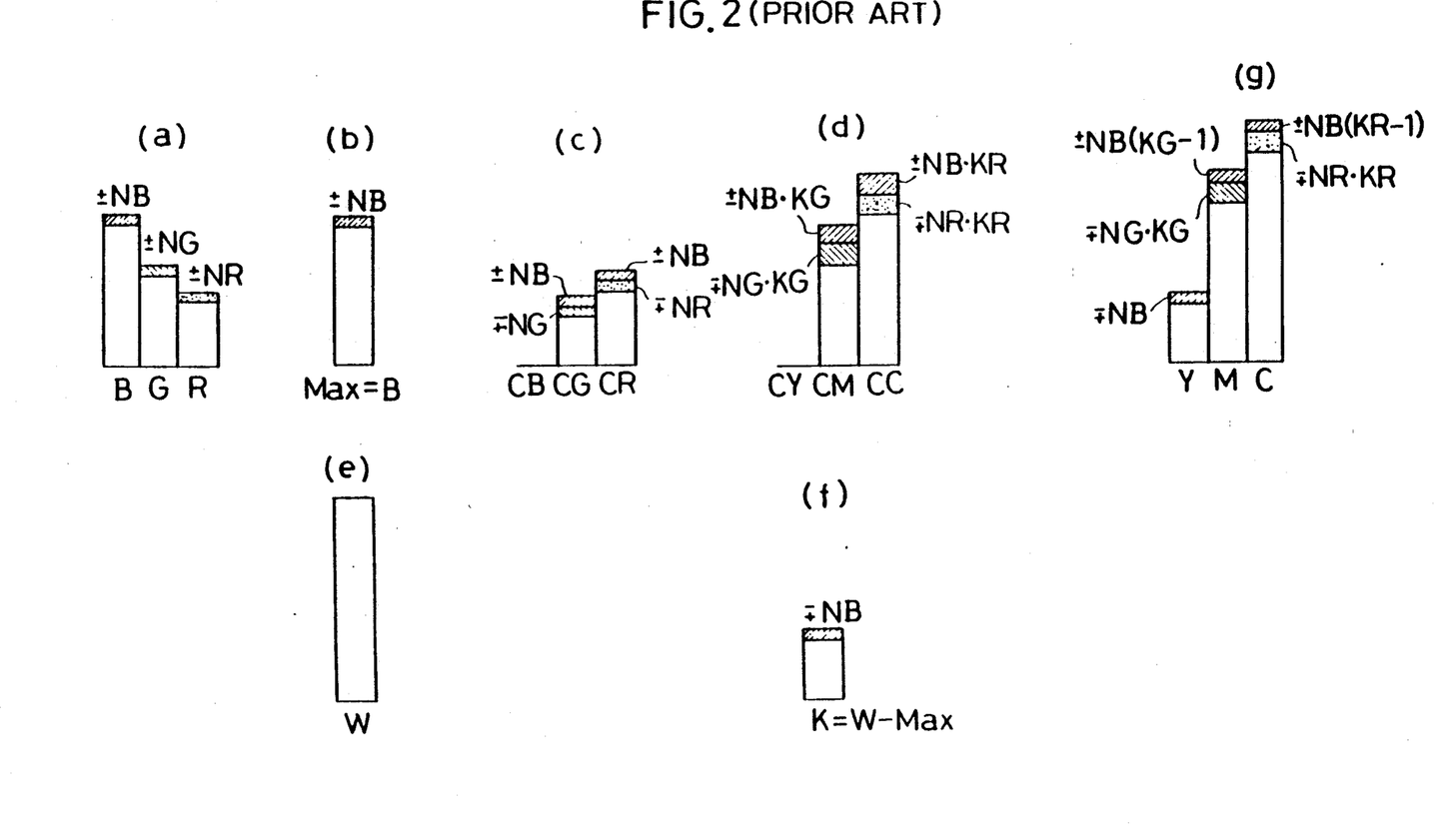

FIG. 1 is a block diagram showing an outline of a conventional image reader using CCD line sensors. FIG. 2 schematically shows levels of B, G and R components in various parts of the image reader and noise levels superposed on the respective components.

In FIG. 1, references 1B, 1G and 1R denote CCD line sensors for detecting blue (B), green (G) and red (red) color components of light transmitted from a color original. Output signals from the CCD line sensors 1B, 1G and 1R are converted by an analog-to-digital converter 2 into digital image signals DB, DG and DR, respectively, which undergo an output compensation process at an output compensator 3 using a black reference level as described hereinbefore. The image signals after the output compensation undergo a logarithmic transformation at a logarithmic transformer 4, and are then applied to a color change circuit 5. FIG. 2 (a) shows the image signals B, G and R as applied to the color change circuit 5. As illustrated, noises ±NB, ±NG and ±NR are superimposed on the respective image signals.

The color change circuit 5 functions to change these log-transformed color image signals B, G and R into four color components of yellow (Y), magenta (M), cyan (C) and black (K). The image signals B, G and R output from the logarithmic transformer 4 are applied to a color difference signal extractor 51 and a luminance signal detector 52. The luminance signal detector 52 detects, as a luminance signal Max, the signal having the highest signal level among the image signals B, G and R input thereto. It is assumed here that the image signal B is detected as the luminance signal Max (see FIG. 2 (b)).

The color difference signal extractor 51 extracts color difference signals CB, CG and CR by subtracting the input image signals B, G and R from the luminance signal Max, respectively. As a result of this extraction process, as shown in FIG. 2 (c), noises ±NB and ∓NG are superimposed on the color difference signal CG, and noises ±NB and ∓NR on the color difference signal CR. The color difference signal CB is in zero level at this stage.

The color difference signals CB, CG and CR are applied to a basic color corrector 53 for correcting turbidity of color inks and variations in spectral characteristics of the optical system. The color corrector 53 includes three lookup tables corresponding to the color difference signals CB, CG and CR. Each lookup table is formed of a memory which receives the corresponding color difference signal as an address, and outputs data stored in a corresponding address region as a color-corrected image signal.

Figure 3:
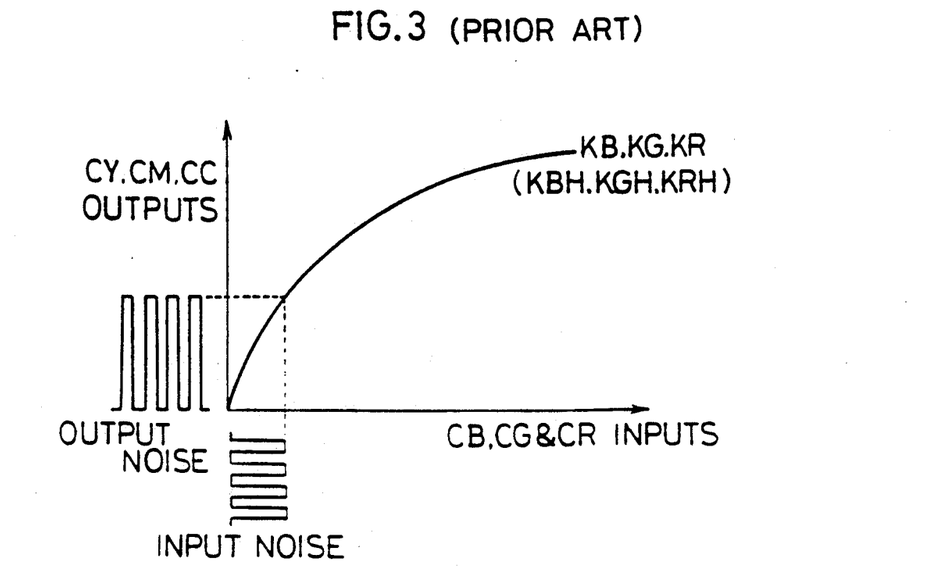
FIG. 3 is a view showing color correction characteristics in which color difference signals are enlarged in regions where the color difference signals are small.

FIG. 3 shows a typical example of color correction characteristics of the color corrector 53. Such color correction characteristics are set to the individual lookup tables. In FIG. 3, references KB, KG and KR are coefficients for multiplying the input color difference signals CB, CG and CR to effect color correction, i.e. enlargement ratios of the color difference signals, respectively. In FIG. 3, these coefficients correspond to the gradient of the color correction characteristics. As seen from FIG. 3, an ordinary image reader has such color correction characteristics that, in order to provide a good color reproduction in highlight portions, the gradient is made steep in a region of small color difference signals to enlarge the small color difference signals. Thus, it will be understood from FIG. 3 that the noises input to the color corrector 53 as superimposed on the color difference signals are enlarged in the region of small color difference signals.

FIG. 2 (d) shows color difference signals CY(KB·CB), CMKG·CG) and CC(KR·CR) corrected by the color corrector 53. As seen, noise components expressed by $(\pm NB \mp NG)KG$ are superimposed on the color difference signal CM, and noise components expressed by $(\pm NB \mp NR)KR$ on the color difference signal CC. The color difference signals corrected in this way are applied to an adder 55 in the next stage.

On the other hand, the luminance signal Max output from the luminance signal detector 52 is applied to a subtracter 54 as well as the color difference signal extractor 51 noted above. The subtracter 54 forms a black signal K by subtracting the luminance signal Max from a white reference signal W shown in FIG. 2 (e). As shown in FIG. 2 (f), a noise $\mp NB$ is superimposed on the black signal K. This black signal K is applied to the adder 55. The adder 55 outputs image signals Y, M and C resulting from color changes effected by adding the black signal K to the corrected color difference signals CY, CM and CC, respectively.

As shown in FIG. 2 (g), a noises expressed by $\mp NB$ is superimposed on the image signal Y, noises $\pm NB(KG-1) \mp NG \cdot KG$ on the image signal M, and noises $\pm (KR-1) \mp N \cdot KR$ on the image signal C. The noise $(\pm NB \mp NG)KG$ superimposed on the image signal M results from the noise $\pm NB \mp NG$ superimposed on the color difference signal CG and multiplied by KG at the color corrector 53. The noises $(\pm NB \mp NR)KR$ superimposed on the image signal C result from the noises $\pm NB \mp NR$ superimposed on the color difference signal CR and multiplied by KR at the color corrector 53.

As described with reference to FIG. 3, the noises included in the color difference signals are enlarged where the color difference signals are small. Moreover, maximum values of B, G and R are reduced in a shadow portion, with the color difference signals tending to be small. As a consequence, the noises become emphasized in the shadow portion.

It will be appreciated that the noises superimposed on the image signals are generated in the shadow portions, and that the more readily are the noises generated the smaller, i.e. the closer to gray, the color difference signals are. This fact identifies with the way in which noises appear on an actual recorded image.

SUMMARY OF THE INVENTION

The present invention is based on the findings described above, and its principal object is to provide an image reading apparatus using CCD line sensors, which is capable of reducing noises in image signals readily generated in shadow portions and in regions where color difference signals are small.

The above object is fulfilled, according to the present invention, by an image reading apparatus using CCD line sensors comprising a logarithmic transformer for effecting logarithmic transformation of blue (B), green (G) and red (R) signals resulting from reading of a color original by the CCD line sensors; a luminance signal detector for detecting a luminance signal among signals emerging from the logarithmic transformation; a color difference signal extractor for extracting color difference signals by subtracting the luminance signal from the respective signals emerging from the logarithmic transformation; a color corrector for effecting color correction of the color difference signals, the color corrector including a plurality of color correcting devices having color correction characteristics with different enlargement ratios of the color difference signals at least for regions where the color difference signals are small; a control device for manually switching the color correcting devices; and an adder for obtaining yellow (Y), magenta (M) and cyan (C) image signals by adding a black signal obtained from the luminance signal to the color difference signals color-corrected by the color corrector.

The number of color correcting devices included in the color corrector is not limitative. Two color correcting devices may be provided, for example, which are a first color correcting device having color correction characteristics for enlarging the color difference signals in the regions where the color difference signals are small, and a second color correcting device having color correction characteristics for limiting the enlargement ratios of the color difference signals in the regions where the color difference signals are small. The control device is then operable to select the first color correcting device or the second color correcting device.

Specifically, the first and second color correcting devices are formed of a first and a second groups of lookup tables, respectively, for receiving the color difference signals as addresses and outputting data stored in corresponding address regions as color-corrected image signals.

Where three CCD line sensors are used to simultaneously detect blue (B), green (G) and red (R) color components from a color original, each of the first and second groups of lookup tables includes three lookup tables corresponding to the three color difference signals.

Preferably, the second group of lookup tables has three color correction characteristics for limiting the enlargement ratios of the color difference signals to the same level for the regions where the color difference signals are small, in order to avoid deterioration in color reproducibility in these regions.

With the apparatus according to the present invention as described above, when a color original does not particularly require enlargement of low level color difference signals, i.e. does not particularly require color reproducibility in highlight regions, the operator manipulates the control device to select color correcting devices having color correction characteristics with relatively small enlargement ratios of the color difference signals. This operation results in non-enlargement of the color difference signals in shadow portions, thereby suppressing noises in the shadow portions.

In a further aspect of the present invention, an image reading apparatus using CCD line sensors comprises a logarithmic transformer for effecting logarithmic transformation of blue (B), green (G) and red (R) signals resulting from reading of a color original by the CCD line sensors; a luminance signal detector for detecting a luminance signal among signals emerging from the logarithmic transformation; a color difference signal extractor for extracting color difference signals by subtracting the luminance signal from the respective signals emerging from the logarithmic transformation; a color corrector for effecting color correction of the color difference signals, the color corrector including a plurality of color correcting devices having color correction characteristics with different enlargement ratios of the color difference signals at least for regions where the color difference signals are small; a color correction characteristics selecting device for selecting color correcting devices having color correction characteristics proving reduced enlargement ratios of the color difference signals in response to reductions in level of the luminance signal; and an adder for obtaining yellow (Y), magenta (M) and cyan (C) image signals by adding a black signal obtained from the luminance signal to the color difference signals color-corrected by the color corrector.

The number of color correcting devices included in the color corrector is not limitative. Three color correcting devices may be provided, for example, which are a first color correcting device having color correction characteristics for providing large enlargement ratios of the color difference signals in the regions where the color difference signals are small, a second color correcting device having color correction characteristics for providing intermediate enlargement ratios, and a third color correcting device having color correction characteristics for providing limited enlargement ratios. The color correction characteristics selecting device is then operable to select the first color correcting device when the luminance signal is in high level, the second color correcting device when the luminance signal is in intermediate level, and the third color correcting device when the luminance signal is in low level.

Specifically, the first to third color correcting devices are formed of a first to a third groups of lookup tables having a first to a third color correction characteristics, respectively. The color correction characteristics selecting device is operable to select a group of lookup tables in accordance with the luminance signal by applying the luminance signal as an upper address to the first to third groups of lookup tables, the selected group of lookup tables receiving the color difference signals as addresses and outputting data stored in corresponding address regions as color-corrected image signals.

Where three CCD line sensors are used to simultaneously detect blue (B), green (G) and red (R) color components from a color original, each of the first to third groups of lookup tables includes three lookup tables corresponding to the three color difference signals.

Preferably, the third group of lookup tables has three color correction characteristics for limiting the enlargement ratios of the color difference signals to the same level for the regions where the color difference signals are small, in order to avoid deterioration in color reproducibility in these regions.

The color corrector may include a color correcting device shared for regions in which the color difference signals are large since there is no difference among the color correction characteristics for these regions.

Specifically, the color corrector is formed of a lookup table having a color correction characteristic shared for the regions in which the color difference signals are large, and a group of lookup tables having a plurality of color correction characteristics with different enlargement ratios of the color difference signals for the regions where the color difference signals are small. By using a common lookup table for the region where the color difference signals are large as noted above, a reduced memory capacity may be used for providing the color correcting devices.

With the apparatus according to the present invention as described above, the luminance signal level is checked for each pixel when reading one color original. When the luminance signal is in high level, automatic switching is made to the color correcting device having the color correction characteristics for enlarging the color difference signals in the regions where the color difference signals are small. When the luminance signal is in low level, switching is made to the color correcting device having the color correction characteristics for suppressing the color difference signals in the regions where the color difference signals are small. Thus, excellent color reproducibility is secured for highlight portions and noises are reduced for shadow portions of the same color original.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIGS. 2A-2G is a view illustrating a disadvantage of the conventional image reader;

FIGS. 4 through 9 show embodiments of the present invention, in which:

DESCRIPTION OF THE PREFERRED EMBODIMENTS

Embodiments of the present invention will be described in detail hereinafter with reference to the drawings.

First Embodiment

Figure 4:
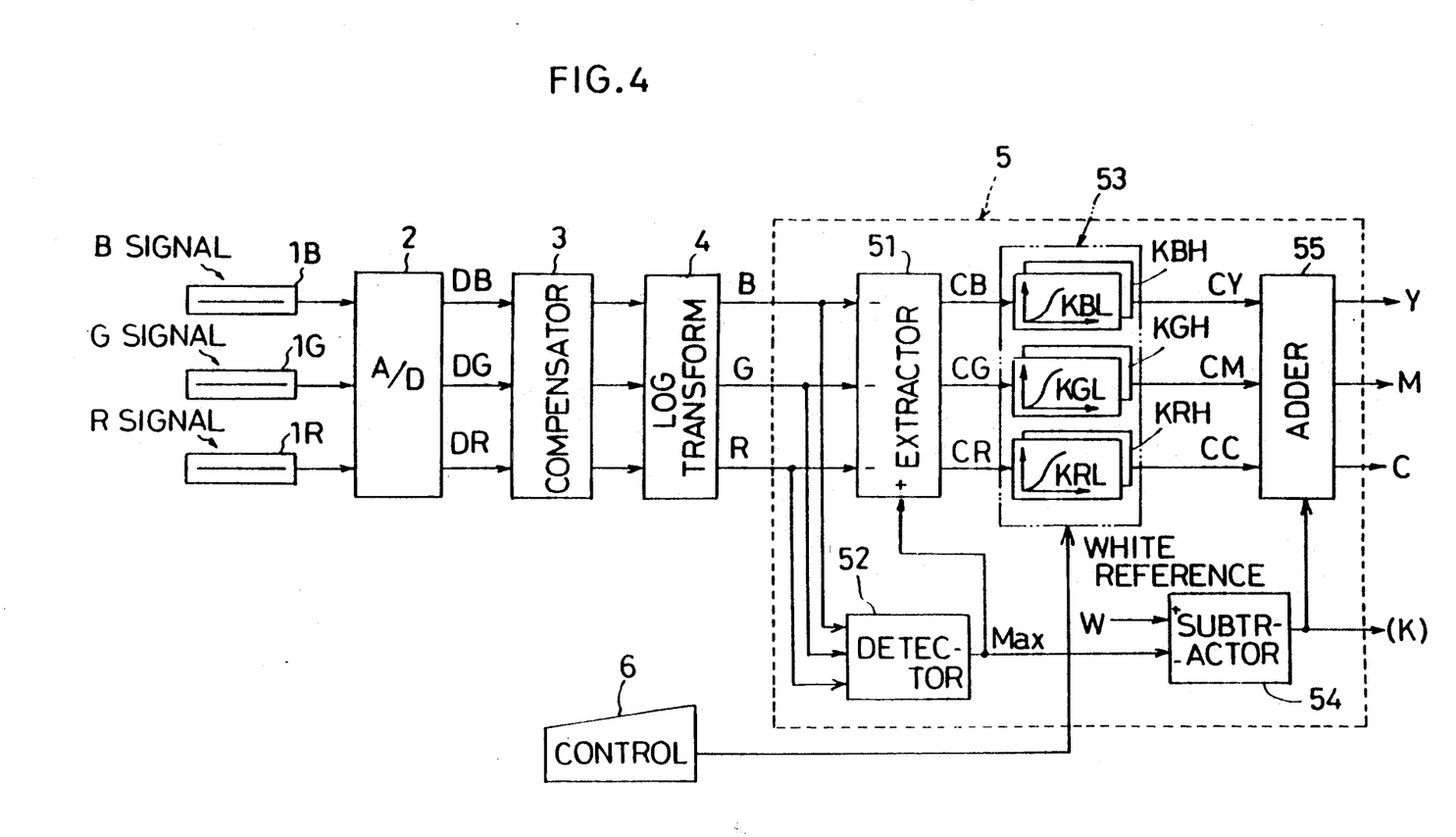
FIG. 4 is a block diagram showing an outline of an image reader in a first embodiment.

FIG. 4 is a block diagram showing an outline of an image reader using CCD line sensors in a first embodiment of the present invention.

The illustrated image reader comprises, as does the conventional image reader shown in FIG. 1, CCD line sensors 1B, 1G and 1R, an analog-to-digital converter 2, an output compensator 3, a logarithmic transformer 4, a color difference signal extractor 51, a luminance signal detector 52, a subtracter 54 and an adder 55. This image reader has characterizing features as set out below.

The image reader in this embodiment includes two groups of lookup tables acting as devices for color-correcting color difference signals CB, CG and CR. The first group of lookup tables has color correction characteristics KBH, KGH and KRH for enlarging the color difference signals in regions where the color difference signals are small. The second group of lookup tables has color correction characteristics KBL, KGL and KRL for withholding enlargement of the color difference signals in the regions where the color difference signals are small. The two groups of lookup tables are switchable by a control signal from a controller 6.

Figure 5:
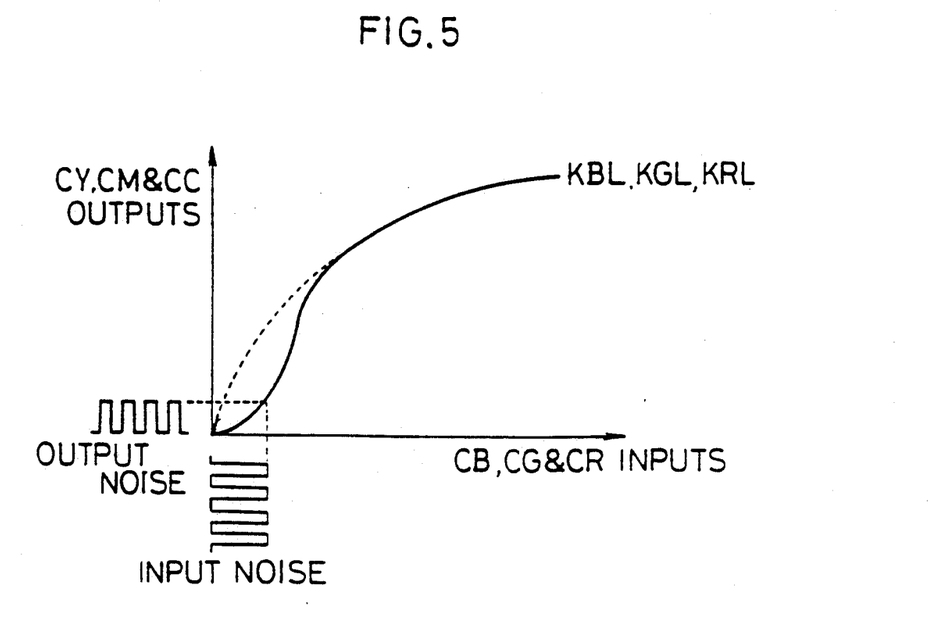
FIG. 5 is a view showing color correction characteristics in which enlargement ratios are limited in regions where the color difference signals are small.

The first group of lookup tables has characteristics similar to those of the conventional image reader shown in FIG. 3. The color correction characteristics KBL, KGL and KRL of the second group of lookup tables are such that, as shown in FIG. 5, enlargement ratios of the color difference signals are reduced in the regions where the color difference signals are small. While the color correction characteristics KBL, KGL and KRL are set individually for the three color difference signals CB, CG and CR, the enlargement ratios in the regions of small color difference signals are set to the same reduction level to avoid a deterioration in color reproducibility.

The operator selects the first group of lookup tables (color correction characteristics KBH, KGH and KRH) or the second group of lookup tables (color correction characteristics KBL, KGL and KRL) by manipulating the controller 6 in accordance with a color original to be read. The color correction characteristics KBH, KGH and KRH are selected when reading a color original of a wall or a curtain in light colors requiring to be reproduced in light colors, for example. On the other hand, the color correction characteristics KBL, KGL and KRL are selected when reading an original including a large number of shadow portions in which noises tend to stand out, or an original having a texture which will show roughness if reproduced too faithfully in a light-colored highlight, thereby to reduce the noises in the shadow portions.

In the embodiment shown in FIG. 4, the two groups of lookup tables are switchable to select a desired one of the two sets of color correction characteristics. However, three or more sets of color correction characteristics may be provided for selection.

Second Embodiment

Figure 6:
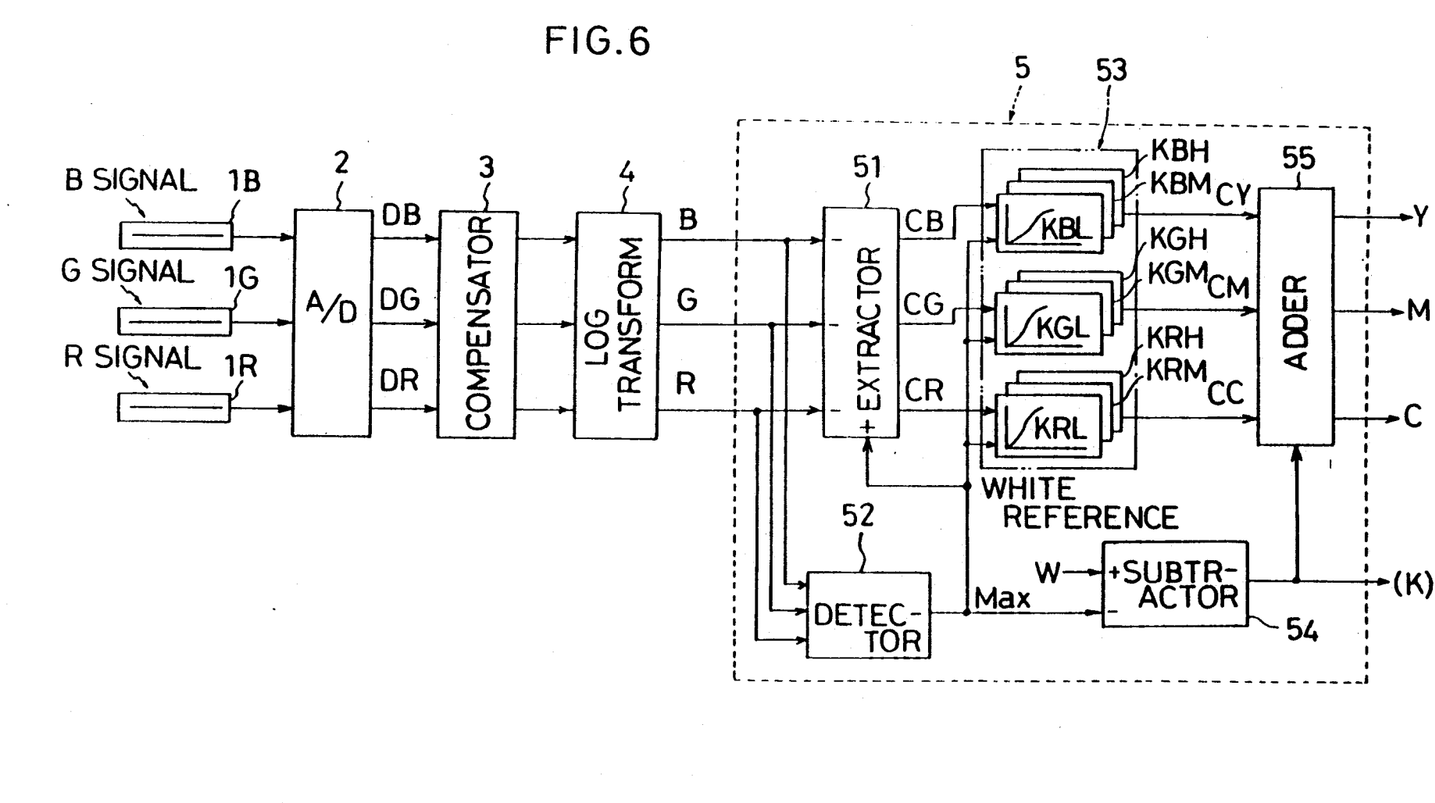
FIG. 6 is a block diagram showing an outline of an image reader in a second embodiment.

FIG. 6 is a block diagram showing an outline of an image reader using CCD line sensors in a second embodiment of the present invention.

Figure 7:
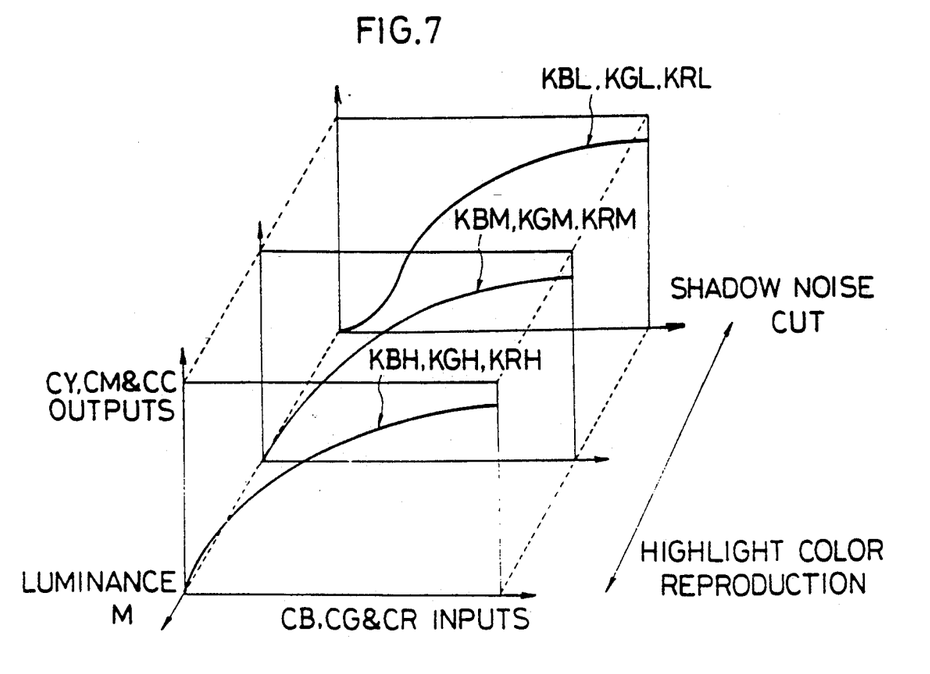
FIG. 7 is a view showing color correction characteristics in the second embodiment.

As shown in FIG. 7, the image reader in this embodiment includes three groups of lookup tables. The first group of lookup tables has color correction characteristics KBH, KGH and KRH providing a large enlargement ratio for regions where the color difference signals are small. The second group of lookup tables has color correction characteristics KBM, KGM and KRM providing an intermediate enlargement ratio. The third group of lookup tables has color correction characteristics KBL, KGL and KRL providing a limited enlargement ratio.

This image reader includes a color correction characteristics selecting device for automatically selecting one of the three groups of lookup tables in accordance with the level of a luminance signal Max of each pixel. Specifically, one of the groups of lookup tables is selected in accordance with the level of a luminance signal Max of each pixel, which is based on the luminance signal Max detected by the luminance signal detector 52 and applied as an upper address to the first, second or third group of lookup tables. The color difference signals CB, CG and CR are applied as lower bits to the selected group of lookup tables.

When the level of the luminance signal Max is relatively high, importance is placed on color reproducibility since the noises have little influences. In this instance, the first group of lookup tables is selected which has the color correction characteristics KBH, KGH and KRH providing the large enlargement ratio for the regions where the color difference signals are small. When the level of the luminance signal Max is relatively low, with the noises imparting great influences, the third group of lookup tables is selected which has the color correction characteristics KBL, KGL and KRL providing the limited enlargement ratio for the regions where the color difference signals are small. When the luminance signal Max is in an intermediate level, the second group of lookup tables is selected which has the intermediate color correction characteristics KBM, KGM and KRM.

In this way, according to this embodiment, one of the groups of lookup tables having different enlargement ratios for the regions in which the color difference signals are small is selected in response to the luminance signal level of each pixel in one color original. Consequently, the same color original has excellent color reproducibility in highlight portions, and yet reduced noises in shadow portions.

In the embodiment shown in FIG. 6, the three groups of lookup tables are switchable in response to the level of the luminance signal Max. However, a greater number of lookup table groups may be provided for selective use of color correction characteristics in multiple sets.

Third Embodiment

As seen from FIG. 7, the color correction characteristics KBH, KBM and KBL, for example, are the same in regions where the color difference signal CB is large. Thus, it cannot be said an efficient use of memories to set these color correction characteristics KBH, KBM and KBL to the different lookup tables. This applied also to the color correction characteristics for the other signals CG and CR.

Figure 9:
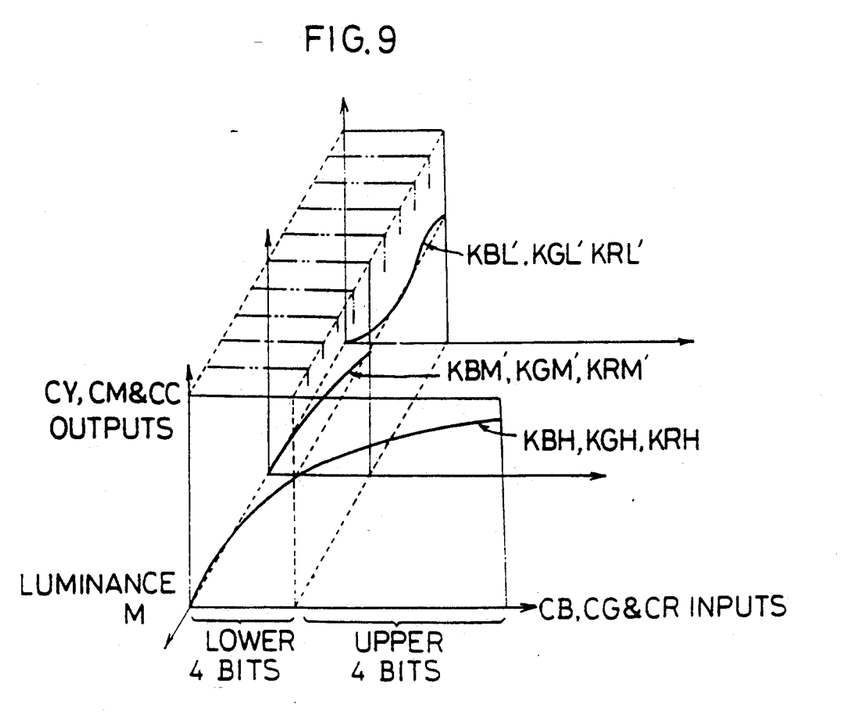
FIG. 9 is a view showing color correction characteristics in the third embodiment.

In this embodiment, as shown in FIG. 9, memory capacity is reduced by setting color correction characteristics (KBL', KGL' KRL', and so on) switchable for use in the regions of small color difference signals CB, CG and CR, and color correction characteristics KBH, KGH and KRH for shared use in the regions of large color difference signals CB, CG and CR.

Figure 8:
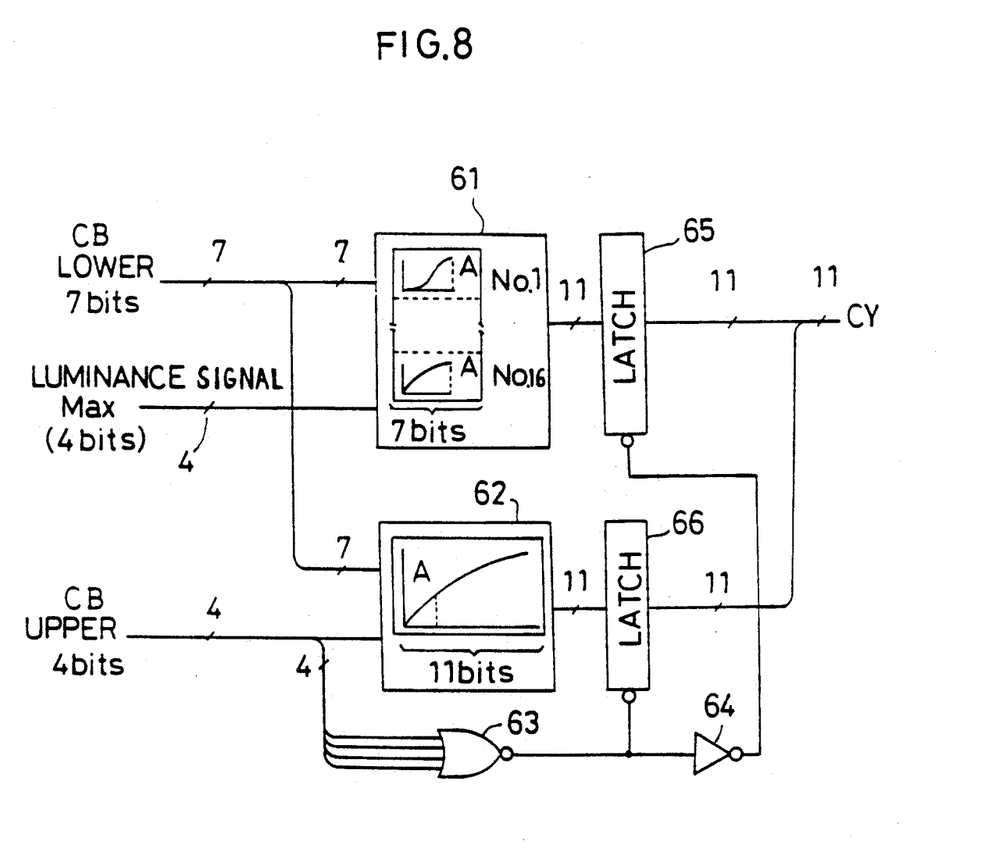
FIG. 8 is a block diagram showing an outline of an image reader in a third embodiment.

Specifically, each of the first, second and third groups of lookup tables which are the same as in the second embodiment is arranged as shown in FIG. 8. This arrangement will be described taking for example a group of lookup tables for converting CB into CY. Numeral 61 denotes a group of lookup tables with a plurality of color correction characteristics having different enlargement ratios for the color difference signal CB. This group provides 16 types of color correction characteristics. Numeral 62 denotes a lookup table having a color correction characteristic shared by regions where the color difference signal CB is large.

One of the 16 lookup tables constituting the group of lookup tables 16 is selected with application of a 4-bit luminance signal Max as an upper address. That is, as the level of the luminance signal becomes lower, a lookup table is selected which has a color correction characteristic for limiting the enlargement ratio of the color difference signal CB. A data of lower 7 bits in the color difference signal CB having an 11-bit data is applied as a lower address to the lookup table selected as above. On the other hand, the lookup table 62 receives the 11-bit color difference signal CB as an address.

When the color difference signal CB is relatively large and one or more bits in the upper 4-bit data is/are "1", output of a NOR gate 63 becomes active, whereby a latch circuit 66 connected to the lookup table 62 becomes active. On the other hand, a latch circuit 65 connected to the group of lookup tables 61 and receiving the output of the NOR gate 63 through an inverter 64 becomes inactive. Thus, when the color difference signal CB is large, only the data output from the lookup table 62 is latched by the latch circuit 66 to be output.

Conversely, when the color difference signal CB is small, the latch circuit 65 becomes active and the latch circuit 66 inactive. As a result, data is taken out of the group of lookup tables 61 through the latch circuit 65. An appropriate color correction characteristic is selected at this time in accordance with the level of the luminance signal Max as described above.

Each of the foregoing embodiments exemplifies an apparatus using three CCD line sensors for simultaneous reading of a color original. However, the present invention is applicable also to an image reader which uses a single CCD line sensor to provide image signals B, G and R by reading the same color original three times.

The present invention may be embodied in other specific forms without departing from the spirit or essential attributes thereof and, accordingly, reference should be made to the appended claims, rather than to the foregoing specification, as indicating the scope of the invention.

What is claimed is:

1. An image reading apparatus using CCD line sensors comprising:

a logarithmic transformer for effecting logarithmic transformation of blue (B), green (G) and red (R) signals resulting from reading of a color original by said CCD line sensors;

a luminance signal detector for detecting a luminance signal among signals emerging from the logarithmic transformation;

a color difference signal extractor for extracting color difference signals by subtracting said luminance signal from the respective signals emerging form the logarithmic transformation;

a color corrector for effecting color correction of said color difference signals, said color corrector including at least one first color correcting means having color correction characteristics for increasing enlargement ratios of said color difference signals for small values of said color difference signals in order to improve color reproduction in highlight portions, and at least one second color correcting means having color correction characteristics for limiting the enlargement ratios of said color difference signals for small values of said color difference signals in order to reduce noise in shadow portions;

control means for manually switching said color correcting means; and an adder for obtaining yellow (Y), magenta (M) and cyan (C) image signals by adding a black signal obtained from said luminance signal to said color difference signals color corrected by said color corrector.

2. An apparatus as defined in claim 1, wherein said control means is operable to select one of said first color correcting means and said second color correcting means.

3. An apparatus as defined in claim 2, wherein said first and second color correcting means are formed of first and second groups of lookup tables, respectively, for receiving said color difference signals as addresses and outputting data stored in corresponding address regions as color-corrected image signals.

4. An apparatus as defined in claim 3, wherein each of said first and second groups of lookup tables includes three lookup tables corresponding to the three color difference signals.

5. An apparatus as defined in claim 4, wherein said second group of lookup tables has three color correction characteristics for limiting the enlargement ratios of said color difference signals to the same level for small values of said color difference signals.

6. An image reading apparatus using CCD line sensors comprising:

a logarithmic transformer for effecting logarithmic transformation of blue (B), green (G) and red (R) signals resulting from reading of a color original by said CCD line sensors;

a luminance signal detector for detecting a luminance signal among signals emerging from the logarithmic transformation;

a color difference signal extractor for extracting color difference signals by subtracting said luminance signal from the respective signals emerging from the logarithmic transformation;

a color corrector for effecting color correction of said color difference signals, said color corrector including at least one first color correcting means having color correction characteristics for increasing enlargement ratios of said color difference signals for small values of said color difference signals in order to improve color reproduction in highlight portions, and at least one second color correcting means having color correction characteristics for limiting the enlargement ratios of said color difference signals for small values of said color difference signals in order to reduce noise in shadow portions;

color correction characteristics selecting means for selecting color correcting means having color correction characteristics providing reduced enlargement ratios of said color difference signals in response to reductions in level of said luminance signals; and an adder for obtaining yellow (Y), magenta (M) and cyan (C) image signal by adding a black signal obtained form said luminance signal to said color difference signals color-corrected by said color corrector.

7. An apparatus as defined in claim 6, wherein said color corrector further includes a third color correcting means having color correction characteristics for providing intermediate enlargement ratios, said color correction characteristics selecting means being operable to select said first color correcting means when said luminance signal is in an high level, said third color correcting means when said luminance signal is in an intermediate level, and said second color correcting means when said luminance signal is in low level.

8. An apparatus as defined in claim 7, wherein said first to third color correcting means are formed of first to third groups of lookup tables having a first to a third color correction characteristics, respectively.

9. An apparatus as defined in claim 8, wherein said color correction characteristics selecting means is operable to select a group of lookup tables in accordance with said luminance signal by applying said luminance signal as an upper address to said first to third groups of lookup tables, the selected group of lookup tables receiving said color difference signals as addresses and outputting data stored in corresponding address regions as color-corrected image signals.

10. An apparatus as defined in claim 8, wherein each of said first to third groups of lookup tables includes three lookup tables corresponding to the three color difference signals.

11. An apparatus as defined in claim 10, wherein said second group of lookup tables has three color correction characteristics for limiting the enlargement ratios of said color difference signals to the same level for the regions where said color difference signals are small.

12. An apparatus as defined in claim 6, wherein said color corrector includes color correcting means shared for large values of said color difference signals.

13. An apparatus as defined in claim 12, wherein said color corrector is formed of a lookup table having a color correction characteristic shared for large values of said color difference signals, and a group of lookup tables having a plurality of color correction characteristics with different enlargement ratios of said color difference signals for small values of said color difference signals.

14. An apparatus as defined in claim 13, wherein said color correction characteristics selecting means is operable to select a lookup table in accordance with said luminance signal by applying said luminance signal as an upper address to said group of lookup tables, the selected lookup table receiving lower bits in said color difference signals as lower addresses and outputting data stored in corresponding address regions as color-corrected image signals, said lookup table having the color correction characteristic for shared use receiving all bits in said color difference signals as addresses and outputting data stored in corresponding address regions as color-corrected image signals.

15. An apparatus as defined in claim 14, wherein said color correction characteristics selecting means further includes:
a first latch circuit for latching the data output from said group of lookup tables having a plurality of color correction characteristics with different enlargement ratios of said color difference signals for small values of said color difference signals;
a second latch circuit for latching the data output from said lookup table having a color correction characteristic shared by large values of said color difference signals; and
a logic circuit operable in response to input of upper bits in said color difference signals to render said first latch circuit inactive and said second latch circuit active when at least one of said upper bits is "1", and to render said first latch circuit active and said second latch circuit inactive when all of said upper bits are "0".

* * * * *